US005793423A

United States Patent [19]
Hamasaki

[11] Patent Number: 5,793,423
[45] Date of Patent: Aug. 11, 1998

[54] SOLID STATE IMAGE SENSING DEVICE

[75] Inventor: Masaharu Hamasaki, Kanagawa, Japan

[73] Assignee: Sony Corporation, Tokyo, Japan

[21] Appl. No.: 498,250

[22] Filed: Jun. 29, 1995

Related U.S. Application Data

[63] Continuation of Ser. No. 236,676, May 2, 1994, abandoned, which is a continuation of Ser. No. 853,300, Mar. 18, 1992, abandoned.

[30] Foreign Application Priority Data

Mar. 18, 1991 [JP] Japan .................................. 3-080867

[51] Int. Cl.[6] ............................................. H04N 5/335
[52] U.S. Cl. .......................... 348/302; 348/301; 348/308; 348/241
[58] Field of Search .................................. 348/241, 300, 348/301, 302, 306, 320, 322; 250/208.1

[56] References Cited

U.S. PATENT DOCUMENTS

| 4,809,075 | 2/1989 | Akimoto et al. | 358/213.18 |
|---|---|---|---|
| 4,914,519 | 4/1990 | Hashimoto et al. | 358/213.18 |
| 4,942,474 | 7/1990 | Akimoto et al. | 358/213.11 |
| 4,967,067 | 10/1990 | Hashimoto et al. | 250/208.1 |
| 5,134,489 | 7/1992 | Sauer | 348/302 |
| 5,144,447 | 9/1992 | Akimoto et al. | 358/213.11 |
| 5,187,583 | 2/1993 | Hamasaki | 358/213.15 |

Primary Examiner—Andrew Faile
Assistant Examiner—Andrew B. Christensen
Attorney, Agent, or Firm—Hill & Simpson

[57] ABSTRACT

The present invention is directed to a solid state image sensing device of an amplifying type which can increase a switching speed during the horizontal scanning by making an output circuit low in impedance. In the output circuit of this amplifying type solid state image sensing device, the FET of source-follower configuration functions as a buffer and a horizontal gate switch. A first switching means is coupled between an output terminal of a capacitor connected to each vertical signal line and the gate electrode of the FET and a second switching means is coupled between the gate electrode of the FET and a reference potential point, respectively, whereby an output resistance and a load capacitance of the output circuit are reduced to enable the output circuit to become low in output impedance.

5 Claims, 2 Drawing Sheets

SOLID STATE IMAGE SENSING DEVICE

This is a continuation of application Ser. No. 08/236,676 filed May 2, 1994, now abandoned; which is a continuation of application Ser. No. 07/853,300 filed Mar. 18, 1992, now abandoned.

BACKGROUND OF THE INVENTION

1. Field of the Invention

The present invention generally relates to solid state image sensing devices and, more particularly, to a solid state image sensing device of amplifying type in which an amplifying element is provided at every pixel.

2. Description of the Prior Art

Of solid state image sensing devices, particularly in a charge-coupled device (CCD) solid state image sensing device, a signal charge is stored in a photo-electric converting section of each pixel in response to an incident light and transferred to an output section in the form of electric charges by using the CCD. However, there is then the disadvantage such that a signal-to-noise (S/N) ratio is frequently deteriorated by a noise component mixed into the signal charge during the signal charges are transferred by the CCD.

As a solid state image sensing device which can obviate the aforesaid disadvantage, Japanese Patent Laid-Open Publication No. 1-154678, for example, discloses a solid state image sensing device of amplifying type in which a photosensor section composed of a photo-electric converting section for storing signal charges in response to an incident light, an amplifying metal oxide semiconductor (MOS) transistor for amplifying and outputting the signal charges stored in the photo-electric converting section to a vertical signal line and a reset means for resetting an input of the amplifying MOS transistor is provided at every pixel of a plurality of pixels arrayed in a two-dimensional fashion.

A main portion of such previously-proposed solid state image sensing device of amplifying type will be described below.

FIG. 1 of the accompanying drawings shows a circuit configuration of an output circuit in this conventional solid state image sensing device.

As shown in FIG. 1, in the output circuit of this kind of solid state image sensing device, a capacitor C is coupled between each vertical signal line 9 and the ground. An output voltage from a photosensor section (not shown) is supplied to and stored in the capacitor C by a sampling switch 31 during the horizontal blanking period and a horizontal gate switch 33 is turned on by a horizontal scanning pulse from a horizontal scanning circuit 19, whereby a hold voltage stored in the capacitor C is sequentially supplied through a buffer 32 to a horizontal signal line 15.

When the horizontal gate switch 33 provided between the buffer 32 and the horizontal signal line 15 is composed of an MOS transistor, then an output impedance $r_B$ of the buffer 32 and resistance $r_S$ of the switching MOS transistor 33 are connected in series and this series resistance $(r_B+r_S)$ is provided as an output impedance of the output circuit.

Because the resistance $r_S$ of the switching MOS transistor 33 is fluctuated in response to the signal level, a channel width W of the switching MOS transistor 33 must be set larger. However, $C_{AI}$ assumes a capacitance of an aluminum (Al) wire used to form the horizontal signal line 15, $C_{JS}$ assumes a gate-source capacitance and source-substrate coupling capacitance of the switching MOS transistor 33 and N assumes the number of pixels in the horizontal direction. Then, a load capacitance $C_H$ of the horizontal signal line 15 is expressed as:

$$C_H = C_{AI} + N \cdot C_{JS}$$

Accordingly, when the channel width W of the MOS transistor 33 is increased, then the capacitance $C_{JS}$ also is increased, resulting in the load capacitance $C_H$ of the horizontal signal line 15 being increased. As described above, if the output impedance is large, then the time constant of the output circuit also is increased so that a switching speed during the horizontal scanning cannot be increased.

OBJECTS AND SUMMARY OF THE INVENTION

Therefore, it is an object of the present invention to provide an improved solid state image sensing device in which the aforesaid shortcomings and disadvantages of the prior art can be eliminated.

More specifically, it is an object of the present invention to provide a solid state image sensing device in which an output circuit is so arranged as to have a low output impedance, thereby increasing a switching speed during the horizontal scanning.

As an aspect of the present invention, a solid state image sensing device is provided, in which an amplifying element for amplifying and outputting photoelectrically-converted signal charges to a vertical signal line is provided at every pixel of a plurality of pixels arrayed in a two-dimensional fashion and charge storing means is connected to each vertical signal line. In this solid state image sensing device, an output circuit composed of a field effect transistor (FET) whose source electrode is connected to a horizontal signal line, a first switching means coupled between an output terminal of the charge storing means and the gate electrode of the FET and a second switching means connected between the gate electrode of the FET and a reference potential point is provided at every vertical signal line.

According to the solid state image sensing device of the present invention, since the source-follower FET functions as the buffer and the horizontal gate switch, the resistance $r_S$ of the conventional horizontal gate switch can be cancelled and as a result the channel width W of the FET can be reduced, which can reduce the load capacitance.

Furthermore, since the first and second switching means are provided on the gate electrode side of the FET, the first and second switching means might be formed of small current switches and need not be directly coupled to the horizontal signal line, thereby removing the load on the horizontal signal line. Therefore, the output resistance and the load capacitance of the output circuit can be reduced and produce the low impedance output, whereby the time constant of the output circuit can be reduced, resulting in the switching speed during the horizontal scanning being increased.

The above and other objects, features, and advantages of the present invention will become apparent from the following detailed description of an illustrative embodiment thereof when read in conjunction with the accompanying drawings, in which like reference numerals are used to identify the same or similar parts in the several views.

DETAILED DESCRIPTION OF THE PREFERRED EMBODIMENT

The present invention will now be described in detail with reference to the drawings.

Figure 2:
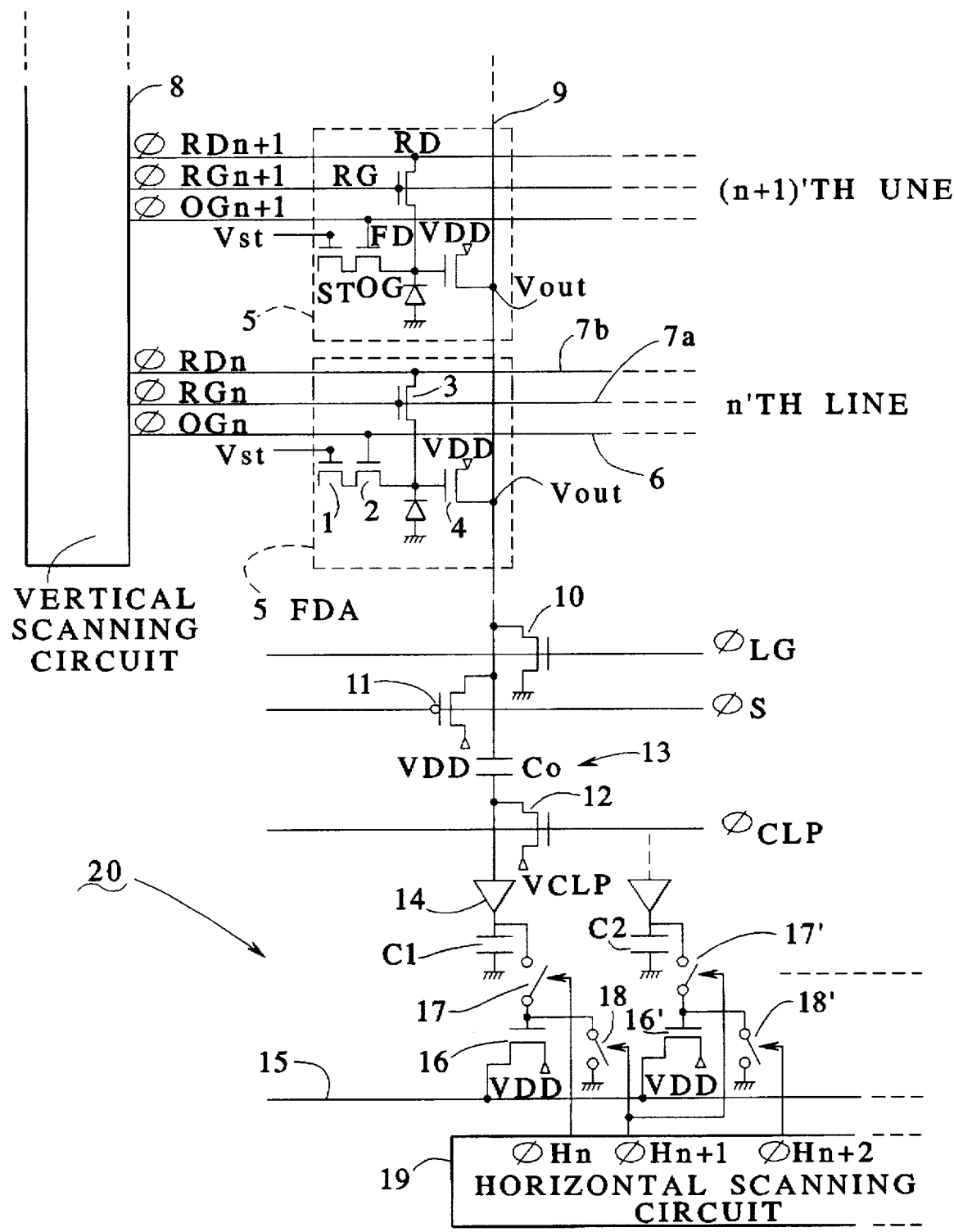
FIG. 2 is a diagram showing a main portion of an embodiment of a solid state image sensing device according to the present invention.

FIG. 2 of the accompanying drawings shows a circuit configuration of a main portion of an embodiment of a solid state image sensing device according to the present invention. While FIG. 2 illustrates the circuit configuration of only one of pixels on each of adjacent n'th and (n+1)'th lines of a plurality of pixels arrayed in the horizontal and vertical direction in an X-Y matrix shape, i.e., in a two-dimensional fashion for simplicity, it is needless to say that the output circuits for other remaining pixels are constructed in exactly the same manner.

Referring to FIG. 2, when a light becomes incident on each pixel, then a signal charge corresponding to the incident light is stored in a storage (ST) section 1. The storage section 1 and an output gate (OG) switch 2 constitute a one-bit CCD. A reset MOS-FET 3 and a source-follower type amplifying MOS-FET 4 are formed on the same chip of this CCD and the gate of the amplifying MOS-FET 4 is coupled to a floating diffusion (FD) section, thereby a floating diffusion amplifier (FDA) 5 being constructed.

In the floating diffusion amplifier 5, the gate electrode of the output gate switch 2 is coupled to an output gate (OG) signal line 6. Also, the gate electrode of the reset MOS-FET 3 is coupled to a reset gate (RG) signal line 7a and the reset electrode thereof is coupled to a reset drain (RD) signal line 7b, respectively. From a vertical scanning circuit 8, an output gate pulse $\phi_{OG}$ is applied to the gate electrode of the output gate switch 2, a reset gate pulse $\phi_{RG}$ is applied to the gate electrode of the reset MOS-FET 3 and a reset drain pulse $\phi_{RD}$ is applied to the drain electrode of the reset MOS-FET 3, respectively, thereby selecting the horizontal line. A power supply voltage $V_{DD}$ is applied to the drain electrode of the amplifying MOS-FET 4 and the source electrode of the MOS-FET 4 is coupled to a vertical signal line 9 as an output terminal $V_{OUT}$. When one horizontal line is selected, the signal charges of all of the pixels on the selected horizontal line are amplified by the amplifying MOS-FETs 4 and output to the vertical signal lines 9.

The vertical signal line 9 is connected with a load MOS transistor 10 and a transfer gate switch 11 formed of a P-type MOS-FET and an amplified output of each pixel output to the vertical signal line 9 is stored in a noise cancelling capacitor $C_0$. A clamping switch 12 is coupled to the output terminal of this capacitor $C_0$ and the clamping switch 12 is turned on by the application of a clamping pulse $\phi_{CLP}$ to the gate electrode thereof, whereby a potential at the output terminal of the capacitor $C_0$ is clamped to the clamping level $V_{CLP}$. The noise cancelling capacitor $C_0$ and the clamping switch 12 constitute a correlated double sampling (CDS) circuit 13 that is used to reduce noises, such as a reset noise or the like involved in the source output of the amplifying MOS-FET 4.

An output of the noise cancelling capacitor $C_0$ is supplied through a buffer amplifier 14 to a sample-and-hold capacitor $C_1$ connected between the output terminal of the buffer amplifier 14 and the ground (reference potential point). A source-follower circuit formed of an FET 16 whose source electrode is coupled to a horizontal signal line 15 is provided as a buffer. A first switching means 17 is coupled between the gate electrode of the FET 16 and the output terminal of the sample-and-hold capacitor $C_1$ and a second switching means 18 is coupled between the gate electrode of the FET 16 and the ground (reference potential point), respectively. Switching control of the first and second switching means 17 and 18 is carried out by a horizontal timing pulse $\phi_H$ output from a horizontal scanning circuit 19. An output circuit 20 is constructed as described above and provided at every vertical signal line 9.

Figure 3:
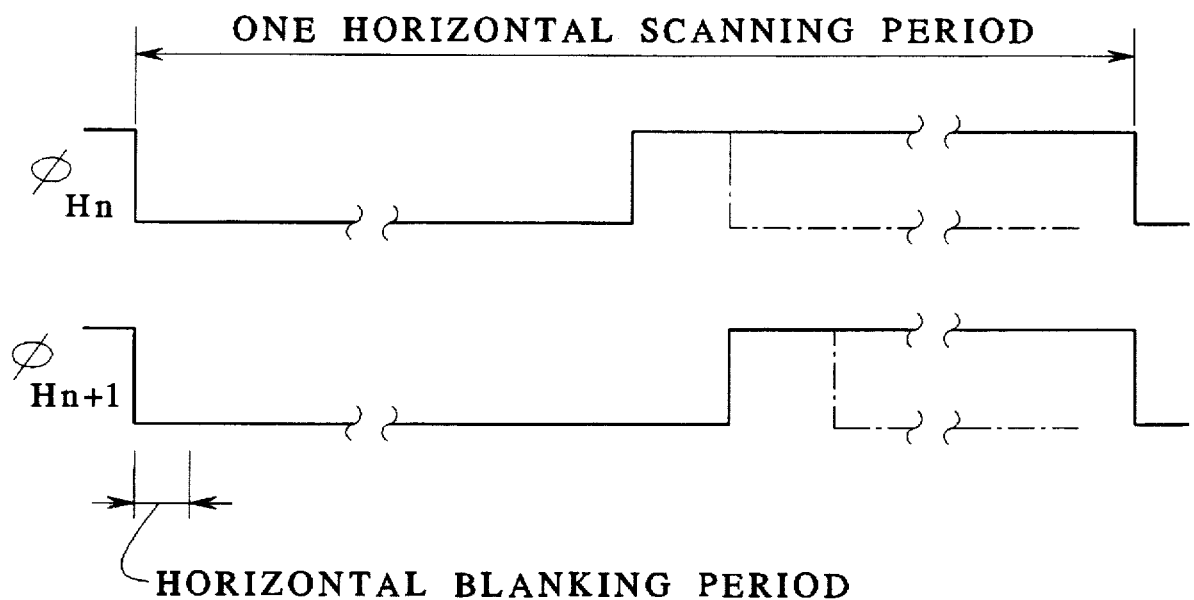
FIG. 3 is a timing chart used to explain operation of an output circuit according to the present invention.

Operation of the output circuit 20 will be described with reference to a timing chart forming FIG. 3.

Within one horizontal scanning period, the first and second switching means 17 and 18 in the horizontal direction are all turned off during the horizontal blanking period and the signal voltages are applied to the capacitors $C_1$. At that time, since the gate electrode of each FET 16 is held at 0 Volt, all the source-follower circuits are set in the off-state. When the first switching means 17 of the n'th line is turned on by the horizontal timing pulse $\phi_{Hn}$ during the effective period, an output voltage of the capacitor $C_1$ of the n'th line is supplied through the first switching means 17 and the FET 16 of the source-follower circuit configuration to the horizontal signal line 15. When the horizontal timing pulse $\phi_{Hn+1}$ goes to high "H" level next, the second switching means 18 is turned on so that the gate electrode of the FET 16 of the n'th line is held at 0 Volt, thereby the FET 16 being turned off. Simultaneously, the first switching means 17' of (n+1)'th line is turned on and an FET 16' on the same line is therefore turned on, whereby an output voltage of a capacitor $C_2$ of the (n+1)'th line is supplied to the horizontal signal line 15. The above-mentioned operation is sequentially repeated in the horizontal direction. After the horizontal timing pulse $\phi_{Hn+1}$ goes to high "H" level, the preceding horizontal timing pulse $\phi_H$, may be held in high "H" level. Alternatively, the preceding horizontal timing pulse $\phi_{Hn}$ may go to low "L" level at the same timing as shown by a one-dot chain line in FIG. 3.

Figure 1:
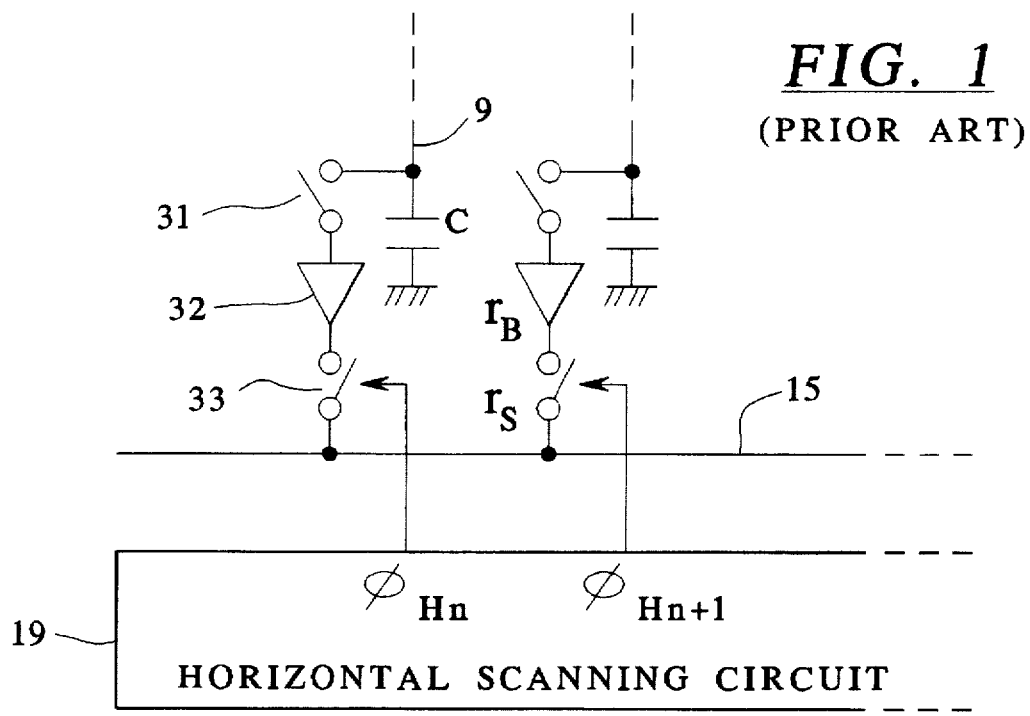
FIG. 1 is a diagram showing a main portion of an output circuit of a CCD solid state image sensing device according to the prior art.

Since the buffer 32 and the horizontal gate switch 33 in the example of the prior art (see FIG. 1) is formed of the source-follower FET 16 as described above, it is possible to cancel the resistance $r_S$ of the conventional horizontal gate switch 33. For this reason, since the channel width W of the FET 16 can be reduced, the load capacitance also can be reduced. Furthermore, since the first and second switching means 17 and 18 are provided on the gate electrode side of the FET 16, the first and second switching means 17 and 18 may be formed of small current switches and need not be directly coupled to the horizontal signal line 15, thereby eliminating the load of the horizontal signal line 15. Therefore, the output resistance and the load capacitance of the output circuit 20 can be reduced and the output impedance of the output circuit 20 can be lowered, whereby the time constant of the output circuit can be reduced. Thus, the switching speed in the horizontal scanning can be increased.

As set out, according to the present invention, in the output circuit of the amplifying type solid state image sensing device in which the amplifying element is provided at every pixel, the FET of source-follower configuration functions as the buffer and the horizontal gate switch and the first switching means is coupled between the output terminal of the capacitor coupled to each vertical signal line and the gate electrode of the FET and the second switching means is coupled between the gate electrode of the FET and the reference potential point. Therefore, the output resistance and the load capacitance of the output circuit can be reduced and the output impedance of the output circuit can be lowered, thereby the time constant of the circuit being reduced. Thus, the switching speed during the horizontal scanning can be increased.

Having described the preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claims.

What is claimed is:

1. A solid state imager comprising;

a photosensing section in which an amplifying element is provided at every pixel of a plurality of pixels arrayed in the horizontal and vertical directions in a two-dimensional matrix configuration for amplifying a signal charge stored in response to incident light formed on the surface of a substrate, a plurality of vertical lines connected to the corresponding ones of said pixels:

a noise canceling means connected to each of said vertical lines for canceling noise;

a signal holding means connected to each of said vertical lines for holding an amplified output supplied thereto through said noise canceling means from each of said pixels in the horizontal direction during the blanking period; and a signal read-out means for reading out an output of said signal holding means to a horizontal output stage through separate switching means and separate buffer means during the horizontal scanning period, wherein said separate buffer means is comprised of a plurality of field-effect transistors of source-follower configuration in one-to-one correspondence with the respective vertical lines, and any one of said plurality of field-effect transistors is sequentially selected during the horizontal scanning period and wherein a horizontal scanning pulse causes simultaneous selection of one of said transistors and turning of an adjacent transistor.

2. A solid state imager comprising:

a plurality of pixels arranged in a matrix configuration and each having a amplifier element, the output of each such amplifier element being connected to one of a plurality of vertical signal lines corresponding to the pixels in said matrix configuration;

a noise cancel circuit in each of said vertical lines:

a charge hold means for receiving an output from said noise cancel circuits; and a buffer means connected to each of said vertical lines for reading out sequentially the output signal of its charge hold means to a horizontal output line during each said horizontal scanning period, said buffer means being in one-to-one correspondence with the respective vertical lines; and said buffer means each including a field-effect transistor (FET), the gate of which is connected directly to the output of said charge hold means through a first switch, and connected to a reference point through a second switch, the source of said field effect transistor being connected to said horizontal output line and wherein a horizontal scanning pulse causes simultaneous selection of one of said transistors and turning off of an adjacent transistor.

3. A solid state imager according to claim 2, wherein said amplifying element is formed of a metal-oxide semiconductor field-effect transistor (MOS-FET).

4. An image sensing device comprising:

a plurality of vertical signal lines;

a corresponding plurality of holding capacitors for receiving a signal in electrical communication with each of the respective vertical lines;

a corresponding plurality of first switches coupled to the respective holding capacitors and a corresponding plurality of second switches coupled between each of the first switches and a reference level;

and a further corresponding plurality of transistors each having its gate connected to the first switch and each of the sources connected to a single output line and wherein a horizontal scanning pulse causes simultaneous selection of one of said transistors and turning off of an adjacent transistor.

5. The image sensing device of claim 4 further comprising:

a clamping switch connected to a noise canceling capacitor.

* * * * *